United States Patent
Yeh et al.

(10) Patent No.: US 8,988,362 B2
(45) Date of Patent: Mar. 24, 2015

(54) GROUP SCANNING CIRCUIT AND METHOD FOR A CAPACITIVE TOUCH SENSOR

(75) Inventors: I-Hau Yeh, Taipei (TW); Chun-Yu Lin, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 707 days.

(21) Appl. No.: 12/700,866

(22) Filed: Feb. 5, 2010

(65) Prior Publication Data

US 2010/0200310 A1    Aug. 12, 2010

(30) Foreign Application Priority Data

Feb. 11, 2009    (TW) ................................ 98104280 A

(51) Int. Cl.
G06F 3/041    (2006.01)
G06F 3/044    (2006.01)

(52) U.S. Cl.
CPC .............. G06F 3/044 (2013.01); G06F 3/0416 (2013.01)
USPC .......................... 345/173; 345/175; 178/18.06

(58) Field of Classification Search
USPC ................................. 345/173, 175; 178/18.06
See application file for complete search history.

(56) References Cited

U.S. PATENT DOCUMENTS

| | | | | |
|---|---|---|---|---|
| 5,543,589 A | * | 8/1996 | Buchana et al. | 178/18.03 |
| 5,691,513 A | * | 11/1997 | Yamamoto et al. | 178/18.07 |
| 5,861,583 A | | 1/1999 | Schediwy et al. | |
| 5,920,309 A | | 7/1999 | Bisset et al. | |
| 6,621,487 B2 | * | 9/2003 | Iwasaki et al. | 345/173 |
| 7,116,315 B2 | * | 10/2006 | Sharp et al. | 345/177 |
| 7,436,395 B2 | | 10/2008 | Chiu et al. | |
| 2006/0279548 A1 | * | 12/2006 | Geaghan | 345/173 |
| 2007/0229468 A1 | * | 10/2007 | Peng et al. | 345/173 |
| 2008/0246723 A1 | * | 10/2008 | Baumbach | 345/156 |
| 2009/0096758 A1 | * | 4/2009 | Hotelling et al. | 345/173 |

FOREIGN PATENT DOCUMENTS

TW    341684    10/1998
TW    200529081    9/2005

* cited by examiner

*Primary Examiner* — Sahlu Okebato
(74) *Attorney, Agent, or Firm* — Muncy, Geissler, Olds & Lowe, P.C.

(57) ABSTRACT

For object detection, a two-step group scan to the traces of a capacitive touch sensor is performed, thereby dramatically shortening the overall scanning time and reducing noise effect. After all the traces are scanned by the pre-scan step to find out the trace of a touch point, the trace of the touch point and traces adjacent thereto are scanned by the re-scan step for more accurate positioning of the touch point.

5 Claims, 6 Drawing Sheets

GROUP SCANNING CIRCUIT AND METHOD FOR A CAPACITIVE TOUCH SENSOR

FIELD OF THE INVENTION

The present invention is related generally to a capacitive touch sensor and, more particularly, to a group scanning touch circuit and method for a capacitive touch sensor.

BACKGROUND OF THE INVENTION

For object detection, conventionally, a capacitive touch sensor sequentially scans all the traces one by one from the first trace to the last trace, as shown in FIG. 1. As shown in the left part of FIG. 1, a capacitive touch sensor 10 includes a substrate 12 and traces X1-Xm and Y1-Ym printed thereon. The substrate 12 may be a glass plate, a plastic membrane, or a printed circuit board (PCB), and the traces X1-Xm and Y1-Ym are patterns made of metal, indium-tin oxide (ITO) film, or other conductive materials. As shown in the right part of FIG. 1, the capacitive touch sensor 10 will scan the traces X1-Xm and Y1-Ym one by one, each time when it performs a scanning process for object detection. For example, during the time period of T0-T1, only the trace Y1 is scanned; during the time period of T1-T2, only the trace Y2 is scanned; and so on.

However, for a large size touch panel, the sequential scanning process needs a very long overall scanning time for completing the scanning of all the traces. On the other hand, noise 14 from the external or from a current source always affects the signals detected from the traces X1-Xm and Y1-Ym. Since noise radiation is time-varying and each of the traces X1-Xm and Y1-Ym is scanned at a different time in the sequential scanning process, the noise radiation will impart non-uniform effect on the analog-to-digital conversion (ADC) values of the traces X1-Xm and Y1-Ym that are derived from the detected signals from the traces X1-Xm and Y1-Ym.

Therefore, it is desired a circuit and method capable of reducing noise interference and shortening an overall scanning time of a capacitive touch sensor.

SUMMARY OF THE INVENTION

An object of the present invention is to provide a circuit and method for scanning the traces of a capacitive touch sensor.

According to the present invention, a circuit for scanning the traces of a capacitive touch sensor includes a multiplexer, a front-end circuit, and several channels therebetween, and a process of scanning the traces of the capacitive touch sensor includes a two-step group scan. For object detection, the multiplexer selects a group of traces from the traces of the capacitive touch sensor to connect to the channels each time, for the front-end circuit to simultaneously extract ADC values therefrom. After all the traces of the capacitive touch sensor are scanned, a touch point and a target trace having a maximum ADC value are detected therefrom. With the target trace as a center, a group of traces including several traces adjacent to the target trace are selected and scanned again, for more accurately positioning the touch point.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
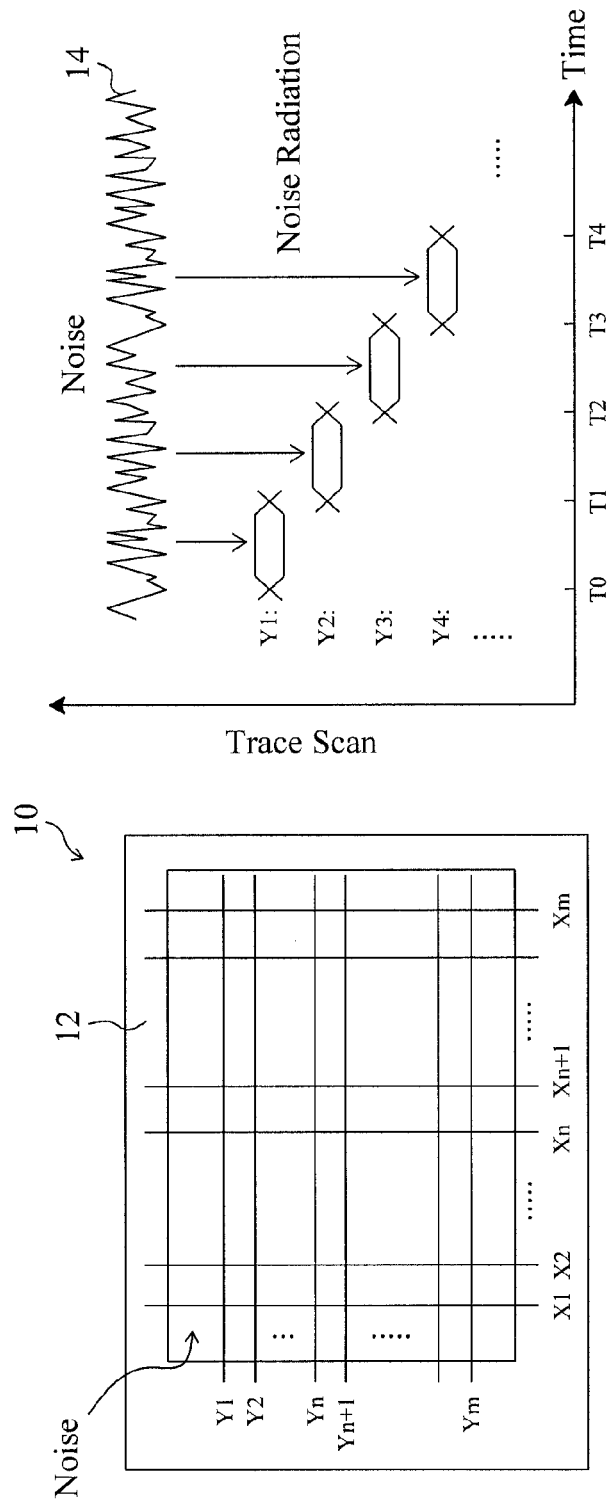
FIG. 1 is a diagram showing a conventional method for scanning the traces of a capacitive touch sensor.
Figure 2:
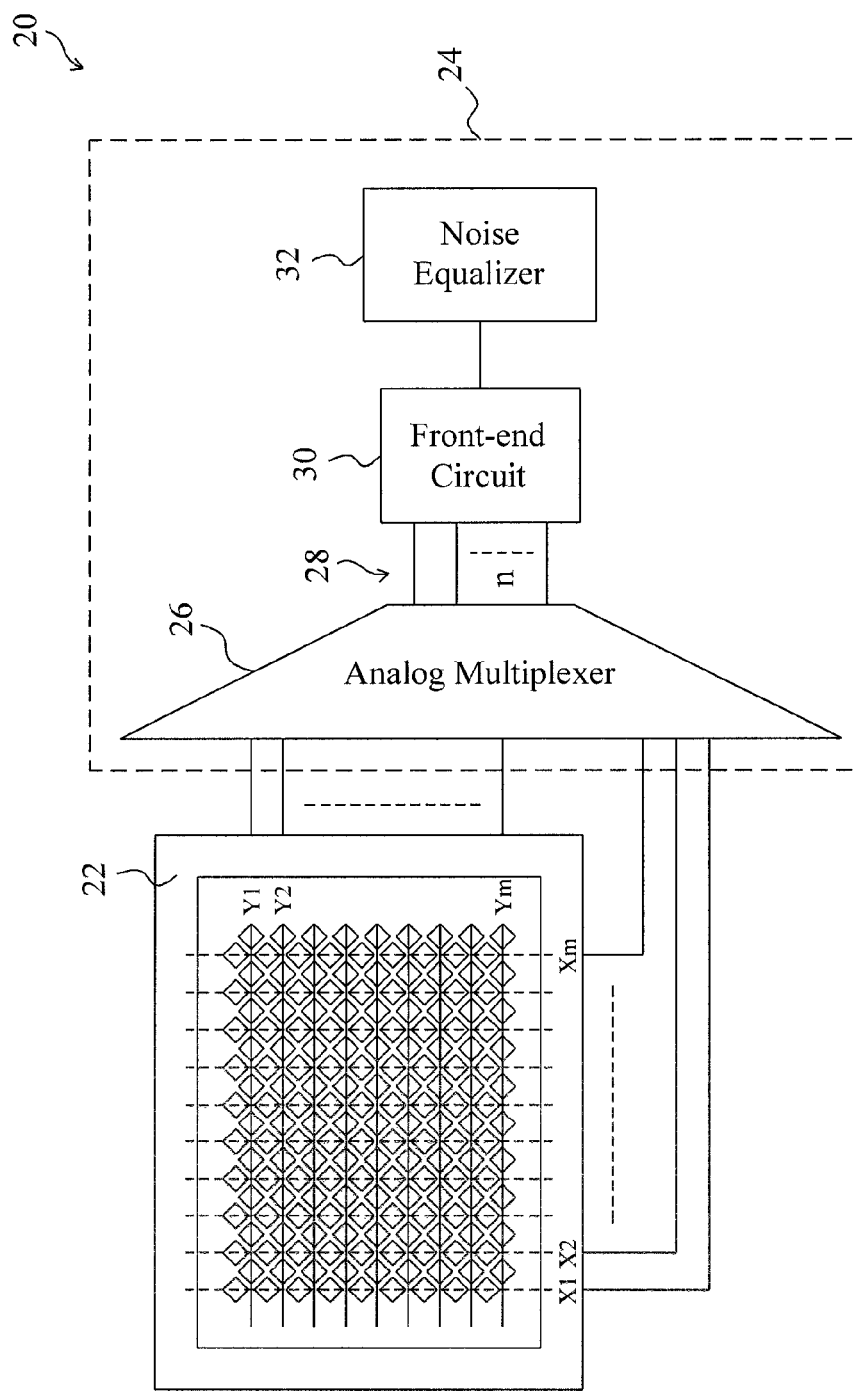
FIG. 2 is a circuit diagram of a capacitive touch sensor.

As shown in FIG. 2, a capacitive touch sensor 20 according to the present invention includes a substrate 22 with traces X1-Xm and Y1-Ym printed thereon, and a touch controller 24 connected to the traces X1-Xm and Y1-Ym. The substrate 22 may be a glass plate, a plastic membrane, or a printed circuit board (PCB), and the traces X1-Xm and Y1-Ym are patterns made of metal, indium-tin oxide (ITO) film, or other conductive materials. In the touch controller 24, an analog multiplexer 26 is connected to the traces X1-Xm and Y1-Ym such that it may select a group of traces from the traces X1-Xm and Y1-Ym to connect to n channels 28 at a time, where n is a positive integer, for a front-end circuit 30 to simultaneously detect the selected traces through the n channels 28 to extract ADC values therefrom, and a noise equalizer carries out noise equalization for the ADC values sent from the front-end circuit 30.

Figure 3:
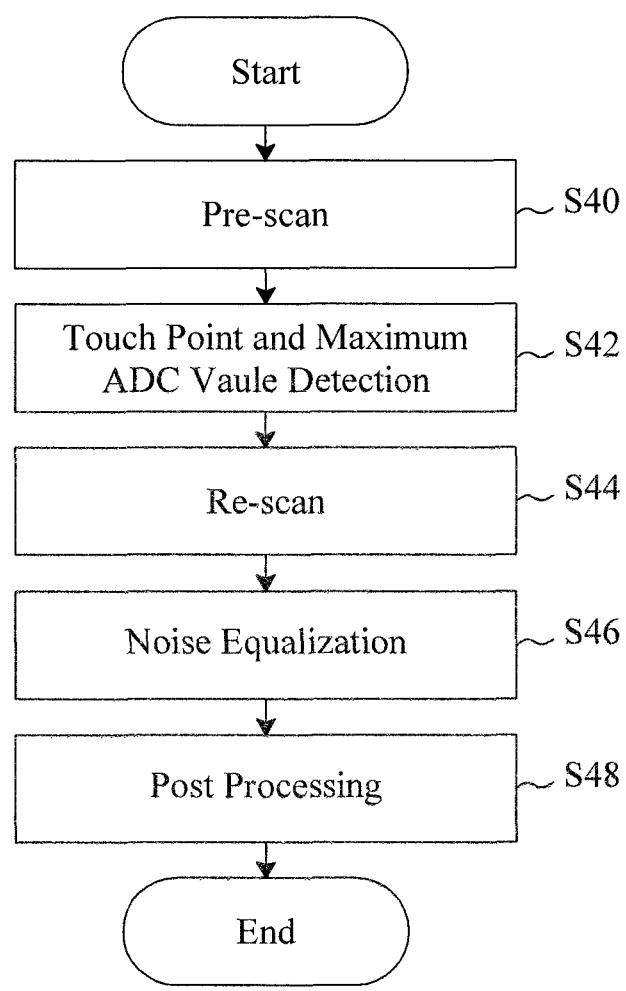
FIG. 3 is a flowchart of a method according to the present invention for scanning the traces of a capacitive touch sensor.
Figure 4:
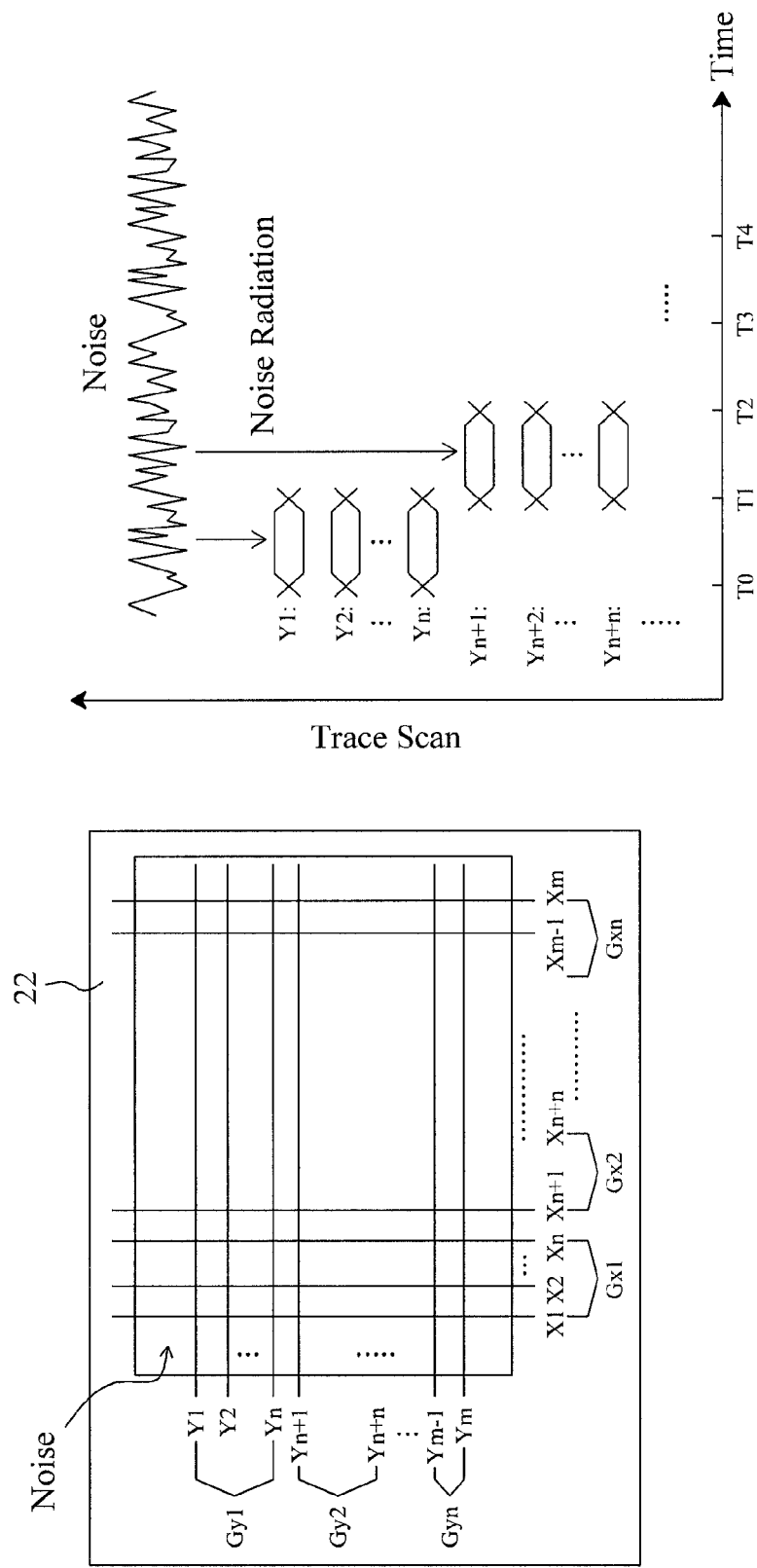
FIG. 4 is a diagram showing group scanning and parallel multiplexing according to the present invention.

A process of scanning the traces X1-Xm and Y1-Ym of the capacitive touch sensor 20 is illustrated by the flowchart shown in FIG. 3, and FIG. 4 a diagram showing group scanning and parallel multiplexing in this process. The traces X1-Xm and Y1-Ym of the capacitive touch sensor 20 are grouped, each including n traces, for example, as shown in the left part of FIG. 4, the traces X1-Xn into group Gx1, the traces Xn+1-Xn+n into group Gx2, the traces Y1-Yn into group Gy1, and the traces Yn+1-Yn+n into group Gy2. When the capacitive touch sensor 20 scans the traces X1-Xm and Y1-Ym, as shown in FIG. 3, pre-scan is performed at step S40 first, which scans the preset groups of traces one by one, and each time only a group of traces are simultaneously scanned. The analog multiplexer 26 connects one of the preset groups to the n channels 28 each time, and the front-end circuit 30 simultaneously detects the n traces of this group. In the scanning process, each time more than two traces are simultaneously scanned, for example, as shown in the right part of FIG. 4, the traces Y1-Yn during the time period of T0-T1, the traces Yn+1-Yn+n during the time period of T1-T2, and so on. Therefore, the overall scanning time for completing the scanning of all the traces X1-Xm and Y1-Ym of the capacitive touch sensor 20 is dramatically shortened. In addition, since the traces of a group are simultaneously scanned, the effect imparted on each of the traces of a same group by noise radiation is almost the same, as shown in the right part of FIG. 4.

Figure 5:
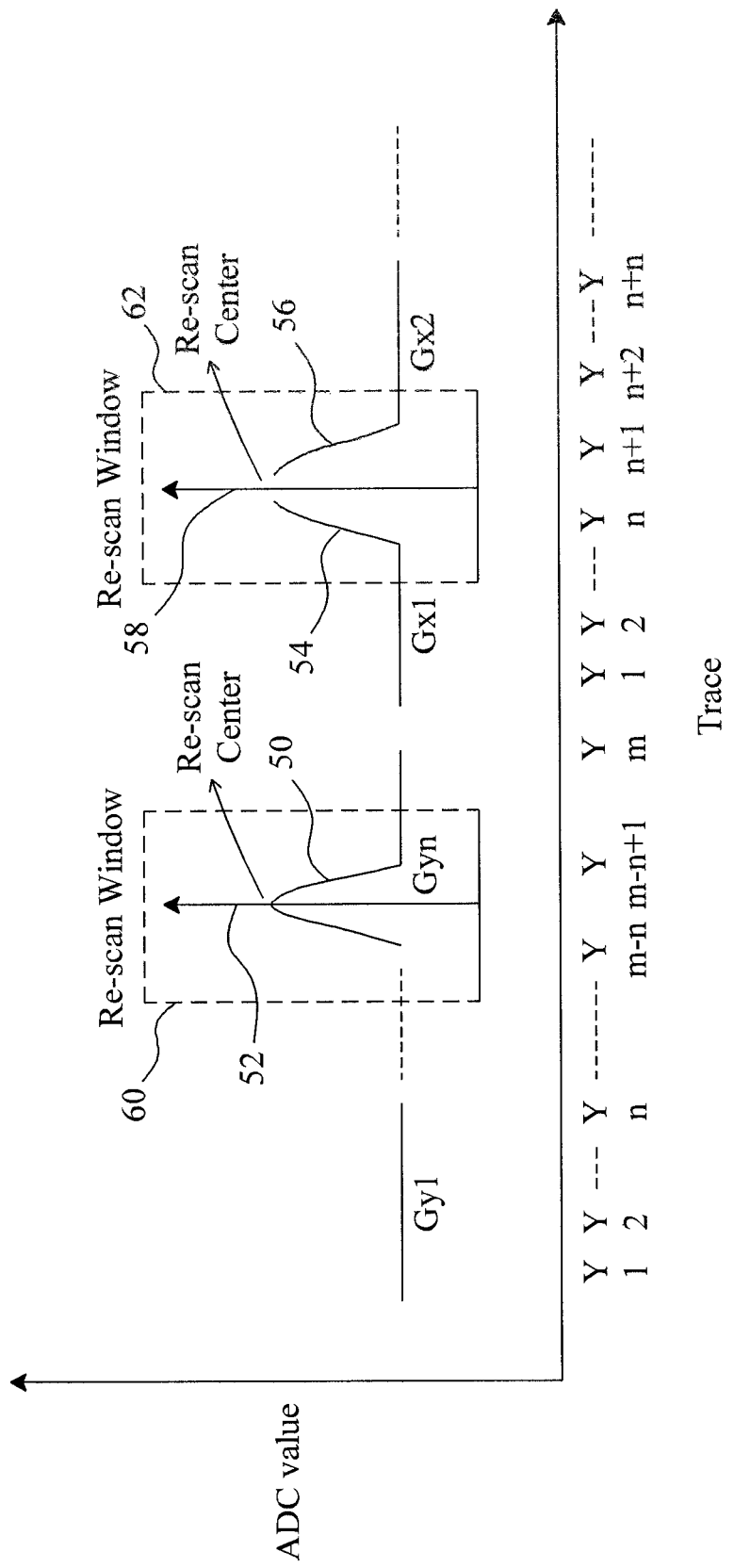
FIG. 5 is a diagram showing re-scan to a touch point according to the present invention.

As shown in FIG. 3, after all the preset groups are scanned, step S42 carries out touch point and maximum ADC value detection with the result of step S40. Then, re-scan is performed at step S44. FIG. 5 is a diagram of re-scan to a touch point that has already found out by step S42. The touch point may fall within a group, for example, as shown by the waveform 50 of FIG. 5, within the group Gyn. The touch point may be on an edge of a group, for example, as shown by the waveforms 54 and 56 of FIG. 5, between the groups Gx1 and Gx2. Since the noise interference to the groups Gx1 and Gx2 may be different, the front-end circuit 30 further finds out the target traces 52 and 58 which have a maximum ADC value, after finding out the traces of the touch points, to perform re-scan. In this re-scan step S44, the analog multiplexer 26 selects n traces as a group, with the target trace 52 as the center and the traces adjacent to the target trace 52, to connect to the n channels 28 for the front-end circuit 30 to detect them again, as shown by the re-scan window 60 of FIG. 5, and then, the analog multiplexer 26 selects n traces as another group, with the target trace 58 as the center and the traces adjacent to the target trace 58, to connect to the n channels 28 for the front-end circuit 30 to detect them again, as shown by the re-scan window 62 of FIG. 5.

In the above step of finding out the target trace having the maximum ADC value, it is to find out the trace having the most significant capacitance variation. In other words, after all the traces of a capacitive touch sensor are scanned, a target trace is selected from the scanning result, and this target trace may be the trace having the most significant capacitance variation. In some touch sense schemes, for example, U.S. Pat. No. 5,920,309, the trace having the most significant capacitance variation will be detected the maximum ADC value therefrom. Under such scheme, the trace having the maximum ADC value is selected as the target trace.

In other embodiments, several traces may be selected as target traces according to the pre-scanning result for a re-scan window to perform re-scan.

Figure 6:
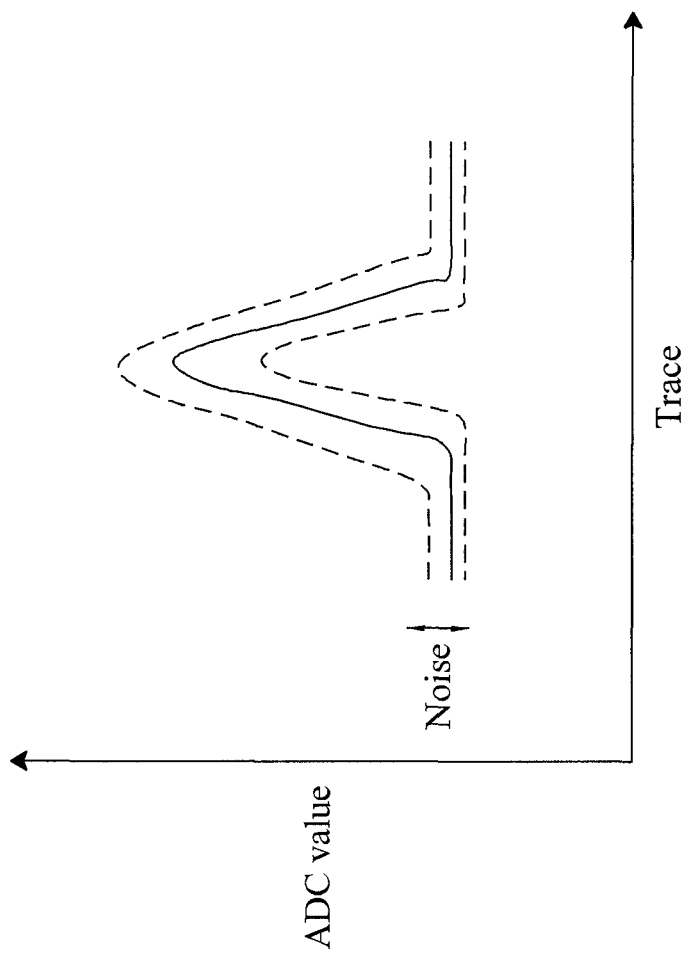
FIG. 6 is a diagram showing noise radiation effect under group scanning.

FIG. 6 is a diagram showing noise radiation effect under group scanning. After re-scan, the ADC values of the traces of a touch point will be offset upwards or downwards, as shown in FIG. 6, since noise radiation affects all the traces of a re-scan window at a same time. Then, as shown in FIG. 3, step S46 carries out noise equalization to the ADC values of all the traces of a re-scan window by the noise equalizer 32, to remove or reduce the offset caused by the noise radiation, thereby eliminating or reducing the noise effect. Finally, step S48 performs post processing, which may include computations for speed and acceleration control of a cursor or others.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A circuit for a capacitive touch sensor, wherein the capacitive touch sensor includes a plurality of traces, the circuit comprising:
   n number channels;
   a multiplexer connected to the n number of channels, for selecting n number of adjacent traces from the plurality of traces to connect to the n number of channels; and
   a front-end circuit connected to the n number of channels, for simultaneously detecting the n number of adjacent traces to extract analog-to-digital conversion values therefrom,
   wherein the front-end circuit selects a target trace having a maximum analog-to-digital conversion value corresponding to a touch point from the plurality of traces after all of the plurality of traces are scanned, and then p number of adjacent traces including the target trace, and
   a noise equalizer connected to the front-end circuit, for performing noise equalization over the analog-to-digital conversion values of the p number of adjacent traces after the p number of adjacent traces are scanned;
   wherein n and p are integers, and n≥2, p≥2; and
   wherein p is less than a number of the plurality of traces.

2. The circuit of claim 1, wherein the multiplexer selects the p number of adjacent traces with the target trace as a center and traces adjacent to the target trace to connect to p number of the channels from the n number of channels for a scanning after all of the plurality of traces are scanned.

3. A method for a capacitive touch sensor, wherein the capacitive touch sensor includes a plurality of traces, comprising:
   (a) selecting n number of adjacent traces from the plurality of traces to connect to n number of channels;
   (b) scanning the n number of adjacent traces simultaneously;
   (c) selecting a target trace having a maximum analog-to-digital conversion value from the plurality of traces after all of the plurality of traces are scanned, wherein the target trace corresponds to a touch point; and
   (d) scanning p number of adjacent traces including the target trace for more accurate positioning of the touch point to extract ADC values of all of the p number of adjacent traces, and
   (e) performing a noise equalization over the ADC values of all of the p number of adjacent traces after the step (d),
   wherein n and p are integers, and n≥2, p≥2; and
   wherein p is less than a number of the plurality of traces.

4. The method of claim 3, wherein the step (d) comprises selecting the target trace as a center and traces adjacent to the target trace as the p number of adjacent traces.

5. A method for a capacitive touch sensor; wherein the capacitive touch sensor includes a plurality of traces, comprising:
   executing a first scan by simultaneously scanning n number of adjacent traces from the plurality of traces to extract capacitance variations therefrom;
   selecting at least one trace having a most significant capacitance variation corresponding to a touch point according to the capacitance variations;
   executing a second scan to scan p number of adjacent traces including the at least one trace selected by the previous step to extract ADC values of all of the p number of adjacent traces, and
   performing a noise equalization over the ADC values of all the p number of adjacent traces after the step of executing the second scan,
   wherein n and p are integers, and n≥2, p≥2; and
   wherein p is less than a number of the plurality of traces.

* * * * *